United States Patent [19]
Vincent et al.

[11] Patent Number: 5,340,386
[45] Date of Patent: Aug. 23, 1994

[54] SILICONE CONTAINING ARTISTS' MEDIA

[75] Inventors: Judith M. Vincent, Midland; Andrew H. Ward, Sanford, both of Mich.

[73] Assignee: Dow Corning Corporation, Midland, Mich.

[21] Appl. No.: 161,564

[22] Filed: Dec. 6, 1993

[51] Int. Cl.$^5$ .............................................. C09D 11/00
[52] U.S. Cl. ................................ 106/19 B; 106/19 C; 106/17 E
[58] Field of Search ................. 106/19 B, 19 C, 19 E, 106/440; 427/541

Primary Examiner—Helene Klemanski
Assistant Examiner—Chris Gallo
Attorney, Agent, or Firm—James L. DeCesare

[57] ABSTRACT

A method of making a drawing media which can be applied to a substrate in which the drawing media is prepared by mixing together a pigment a binder, and an organosilicon compound. The organosilicon compound is a volatile low viscosity methylsilicone fluid which is either a cyclic silicone polymer or a short chain linear silicone polymer. The silicone containing drawing media is applied to the substrate, and the drawing media is allowed to dry on the substrate.

10 Claims, No Drawings

SILICONE CONTAINING ARTISTS' MEDIA

BACKGROUND OF THE INVENTION

This invention is directed to a drawing media which contains an organosilicon compound. The presence of the organosilicon compound in the drawing media as an ingredient, results in the smoother application of the medium, easier blending of colors on the substrate, and the elimination of the need for applying a fixative to the completed drawing.

The artists in the twentieth century have at their fingertips a wide variety and selection of drawing media from which to choose. Some representative types of drawing media which can be used by the modern artist are charcoal, conte' crayon, colored pencil, graphite pencil, color markers, pastel, pen and ink, acrylics, water colors, and gouache. Pastels themselves come in a wide variety of consistencies including soft pastel chalk, oil pastel, pastel pencil, and neopastel crayon.

Chalk pastels, which typically contain pigment, precipitated chalk and gum tragacanth, apply very smoothly to the drawing substrate. Once applied, individual colors are readily blended. The blending ability of chalk pastels is essentially unlimited. Soft pastels and other forms of drawing media containing a minimum amount of binder, such as charcoal and graphite pencil require the application of a fixative to the substrate during the painting process in order to fix the drawing media and the image to the substrate. Due to the nature of the drawing media, lack of a fixative would cause the drawing media to rub off easily. To prevent this from occurring, the artist using charcoal, graphite pencil, or pastel drawing media, sprays a fixative solution containing glue or resin lightly over the picture.

Works of art in pastel and other friable materials such as charcoal and graphite pencil, are known to be inherently unstable. The pastel medium consists of dry pigment particles held together with a binder. The sole function of the binder which is typically gum tragacanth, is to hold the pigment particles together in order to form a stick. The stick is used to apply the pastel pigments to the paper substrate. The pastel particles have a natural tendency to flake off from the paper substrate. Virtually any condition, such as vibration of the piece during travel or extensive handling, affects the weak forces holding the particles to the substrate, resulting in damage to the piece and loss of pigment.

The use of a fixative, however, has not been found to be advantageous for a number of reasons, including the fact that once the fixative is applied to the work, the fixative cannot be removed without total destruction of the work. Application of a fixative further causes undesirable changes in the overall color balance and color relationships of a finished work created in pastel media, or other friable media such as charcoal and graphite pencil.

Oil pastels, in contrast to chalk pastels, are essentially self-fixing because the pigment is entrapped in the wax binder. In soft pastels, the amount of binder is minimal and the pigment is delivered through the chalk particles which do not adhere to the drawing surface unless fixed.

Since oil pastels are wax based, they are soluble in common paint solvents such as turpentine and mineral spirits. Once the medium is applied to the drawing, the strokes can be blended and softened through the use of brushes and cloths dipped in the solvent. This technique results in more painterly effects than can be achieved with chalk pastels.

Oil pastels, however, do have some disadvantages when compared to chalk-based media. The smoothness of application using oil pastels is noticeably superior when using chalk pastels. Greater pressure must be exerted when applying oil pastels than when using soft pastels to maintain the same degree of evenness to the stroke. In addition, chalk pastel colors are more easily blended on the drawing substrate. The wax contained in oil pastels renders them more resistant to blending.

Oil pastels are also limited in the number of colors which can be blended together before the resulting tones appear muddy. No more than a few colors should be blended in order to avoid obscuring the color In this manner.

The present invention seeks to add certain advantages of chalk pastels to an oil pastel medium, while maintaining the benefits which oil pastels offer. Specifically, a medium is described which combines the ease of application and blending of soft pastels with the self-fixing durability and solvent dilution ability of oil pastels.

SUMMARY OF THE INVENTION

The invention relates to a drawing media and to a method of making a drawing media for application to a substrate. In accordance with the method, a drawing media is prepared by mixing together a pigment, a binder, and an organosilicon compound which is a volatile low viscosity methylsilicone fluid. The volatile low viscosity methylsilicone fluid is a cyclic silicone polymer having the formula $[(CH_3)_2SiO]_x$ or a short chain linear silicone polymer having the formula $(CH_3)_3SiO[(CH_3)_2SiO]_ySi(CH_3)_3$. In each formula, x is an integer having a value of from three to ten, and y is an integer having a value of from zero to about four. The silicone containing drawing media is applied to the substrate, and the drawing media is allowed to dry on the substrate.

These and other features, advantages, and objects, of the herein defined present invention will become more apparent when considered in light of the following detailed description thereof.

DETAILED DESCRIPTION OF THE INVENTION

The invention is directed to drawing media used by artists such as oil pastel (CRAY PAS), wax-oil crayon, and neopastel crayon.

The essential ingredients of the drawing media are a pigment, a binder, and an organosilicon compound which is a volatile silicone.

The volatile silicone in accordance with the present invention is a low viscosity methylsilicone fluid. The volatile low viscosity methylsilicone fluid corresponds to the average unit formula $(CH_3)_aSiO_{(4-a/2)}$ wherein a is an integer having an average value of from two to three. The methylsilicone fluid contains siloxane units joined by Si—O—Si bonds. Representative units are $(CH_3)_3SiO_{\frac{1}{2}}$, $(CH_3)_2SiO_{2/2}$, $(CH_3)SiO_{3/2}$, and $SiO_{4/2}$. These units are present in molar amounts such that there is provided an average of from about two to three methyl groups per silicon atom in the methylsilicone fluid, whereby the methylsilicone fluid has a viscosity of less than about one hundred centistokes measured at twenty-five degrees Centigrade.

The volatile low viscosity methylsilicone fluid contains dimethylsiloxane units and optionally trimethylsiloxane units. Preferably, the methylsilicone fluid has a viscosity of less than about ten centistokes. Representative compounds are cyclopolysiloxane compounds of the formula $[(CH_3)_2SiO]_x$, and linear siloxane compounds of the formula $(173\ CH_3)_3SiO[(CH_3)_2SiO]_ySi(CH_3)_3$, in which x is an integer having a value of from three to ten, and y is an integer having a value of from zero to about four.

The volatile low viscosity methylsilicones have boiling points generally less than about two hundred-fifty degrees Centigrade, and possess viscosities preferably generally less than about ten centistokes measured at twenty-five degrees Centigrade. Most preferably, the viscosity is 0.65 to 5.0 centistokes.

The cyclopolysiloxane compounds have been assigned the adopted name "CYCLOMETHICONE" by The Cosmetics, Toiletries and Fragrance Association, Inc., Washington, D.C. (CTFA). Both the cyclopolysiloxanes and the linear siloxanes are clear fluids, and are essentially odorless, nontoxic, nongreasy and nonstinging. Cosmetically, these methylsilicone fluids are nonirritating to skin, and exhibit enhanced spreadability and ease of rub-out when applied. Once applied, the materials evaporate leaving behind no residue.

Methylsilicone fluids which are operable in accordance with the present invention leave substantially no residue after thirty minutes at room temperature when one gram of fluid is placed at the center of a No. 1 circular filter paper having a diameter of 185 mm supported at its perimeter in open room atmosphere. By methylsilicone fluid is meant a composition containing two or more silicon atoms, all of which are bonded by way of at least one oxygen atom to at least one other silicon atom and at least one methyl radical, each silicon valence not satisfied by oxygen being satisfied by a methyl radical.

Representative methylsilicone fluids found to be especially useful in accordance with the present invention are hexamethyldisiloxane which has a boiling point of 99.5 degrees Centigrade and the formula $Me_3SiOSiMe_3$; octamethyltrisiloxane which has a boiling point of 152 degrees Centigrade and the formula $Me_3SiOMe_2Si\text{-}OSiMe_3$; hexamethylcyclotrisiloxane which has a boiling point of 133 degrees Centigrade and the formula $[(Me_2)SiO]_3$; octamethylcyclotetrasiloxane which has a boiling point of 171 degrees Centigrade and the formula $[(Me_2)SiO]_4$; and decamethylcyclopentasiloxane which has a boiling point of 205 degrees Centigrade and the formula $[(Me_2)SiO]_5$.

These methylsilicone fluids may be used alone, or as mixtures in combinations of two or more. Mixtures of the methylsilicone fluids will result in a volatile material having an evaporating behavior different from any one of the individual methylsilicone fluids.

In some instances, it may be desirable to replace one or more of the methyl groups In the methylsilicone fluid with other groups. Thus, there may be substituted groups such as alkyl radicals having two to twelve carbon atoms; aryl radicals having six to ten carbon atoms; amine groups; vinyl; hydroxyl; haloalkyl groups; aralkyl groups; and acrylate groups, for example.

Any binder may be employed including tragacanth gum and its derivatives; cellulose derivatives; alignates; gum arabic; fatty alcohols with mope than eleven carbon atoms such as the waxy materials stearyl and isostearyl alcohol, cetyl alcohol, lauryl alcohol, myristyl alcohol, erucyl alcohol, oleyl alcohol, linoleyl alcohol, and cetearyl alcohol; or polyvinyl alcohols. Hydrocarbon waxes, animal fats, and vegetable fats, can also be used as the binder.

In some instances, it may be desirable to include a pigment extender or a mineral filler such as chalk, gypsum, powdered talc, calcium carbonate, silica, alumina, feldspar, or kaolin, in the drawing media. Other common adjuvants which may be added are a pigment dispersing agent, a preservative, an oxidation or UV stabilizer, a mold release agent, and a plasticizer.

Representative plasticizers include paraffin waxes, microcrystalline waxes, vegetable fats, and animal fats. Representative pigment dispersing agents include fatty acids having from fourteen to twenty-four carbon atoms such as stearic acid, Representative mold release agents are Group IIA metal salts of fatty acids such as calcium stearate. Representative oxidation and UV stabilizers are sterically hindered phenols, hindered amine light stabilizers, and benzotriazoles.

The pigment component employed can be a traditional pigment or a modern pigment, and includes natural and synthetic pigments, and some dyes. Representative of the pigments which can be used, for example, ape pigments known under any of the COLOR NAMES: Alizarin Carmine; Alizarine Crimson; Antwerp Blue; Aureolin; Aurora Yellow; Brown Madder Alizarin; Burnt Sienna; Burnt Umber; Cadmium Lemon; Carmine; Cerulean Blue; Chrome Orange; Cinnibar Green; Cobalt Violet; Crimson Lake; Cyanine Blue; French Ultramarine; Genuine Rose Madder; Hooker's Green; Indian Red; Indigo; Ivory Black; Juane Brilliant; Manganese Blue; Mauve; Naples Yellow; New Gamboge; Olive Green; Permanent Magenta; Prussian Blue; Purple Madder Alizarin; Rose Carthame; Sap Green; Scarlet Lake; Sepia; Terre Verte; Vandyke Brown; Venetian Red; Viridian; Warm Sepia; Windsor Blue; and Yellow Ochre.

Among the numerous dyes which may be employed are Azo Dyes, Anthraquinone Dyes, and Xanthene Dyes. Representative dyes are Citrus Red 1; Green 6; Yellow 11; Red 17; Violet 2; Solvent Yellow 14; Solvent Blue 56; Solvent Red 111; Acid Red 52; Acid Yellow 7; and Solvent Orange 63.

The invention will be illustrated in more detail in the following examples.

EXAMPLE I

An oil pastel stick containing cobalt blue pigment (sold by Sanford Corp., Bellwood, Ill.) was melted in a 10 ml. pyrex beaker on a hot plate until fluid. 4.75 grams of the melted pastel was combined with 0.25 grams of decamethylcyclopentasiloxane and stirred until uniform. This mixture was poured into a mold. When solidified, an oil pastel drawing stick was produced containing 5.0% of decamethylcyclopentasiloxane by weight.

EXAMPLE II

An oil pastel stick containing cobalt blue pigment (sold by Sanford Corp., Bellwood, Ill. was melted in a 10 ml. pyrex beaker on a hot plate until fluid. It was poured into a mold. When solidified, an oil pastel drawing stick was produced which served as a "control" for comparison with EXAMPLE I.

EXAMPLE III

An oil pastel stick containing cadmium yellow pigment (sold by Sanford Corp., Bellwood, Ill. was melted in a 10 ml. pyrex beaker on a hot plate until fluid. 4.75 grams of the melted pastel was combined with 0.25 grams of decamethylcyclopentasiloxane and stirred until uniform. This mixture was poured into a mold. When solidified, an oil pastel drawing stick was produced containing 5.0Y, of decamethylcyclopentasiloxane by weight.

EXAMPLE IV

An oil pastel stick containing cadmium yellow pigment (sold by Sanford Corp., Bellwood, Ill. was melted in a 10 ml. pyrex beaker on a hot plate until fluid. It was poured into a mold. When solidified, an oil pastel drawing stick was produced which served as a "control" for comparison with EXAMPLE III.

EXAMPLE V

The smoothness of application on a medium weight drawing paper substrate was compared using stick forms of drawing media prepared in Examples I and II. Example I was evaluated as giving a smoother and easier application. The color was easier to blend and rub into the surface of the paper. When Example III was compared to Example IV, the same observations were made. The stick containing decamethylcyclopentasiloxane gave a superior performance in terms of application and blending.

EXAMPLE VI

Several strokes each of the sticks of Example I and Example III were applied adjacent to each other on the drawing surface. The colors were rubbed together resulting in a shade of green. The same procedure was used the sticks of Examples II and IV. The volatile silicone-containing sticks produced colors which were more easily blended together than the "control" sticks.

EXAMPLE VII

A round camel hair watercolor brush approximately 0.5 cm in diameter was dipped into mineral spirits and applied to the drawing surface over the color areas generated by drawing with the sticks of Examples I–IV. All colors were judged as being equally soluble.

EXAMPLE VIII

A round camel hair watercolor brush approximately 0.5 cm in diameter was dipped into decamethylcyclopentasiloxane and applied to the drawing surface over the color areas generated by drawing with the sticks of Examples I–IV. All colors were judged as being equally soluble. The colors of the drawing were found to be substantially fixed to the paper substrate without the necessity of application to the substrate of a hydrocarbon based film forming spray. The colors of Examples I and III were equally bound to the substrate as the colors of Examples II and IV.

The drawing media according to the present invention contains from 0.to 5.0 percent by weight of pigment or dye; from 30.0 to 90.0 percent by weight of binder; and from 0.1 to 20.0 percent by weight of the volatile silicone. Common adjuvants may be included such as a pigment extender or mineral filler, a pigment dispersing agent, a preservative, an oxidation or UV stabilizer, a mold release agent, or a plasticizer.

Other variations and modifications may be made in the compounds, compositions, and methods, described herein without departing from the essential features and concepts of the present invention. The forms of the invention described herein are exemplary only and are not intended as limitations on the scope of the invention as defined in the appended claims.

That which is claimed is:

1. A method of making a drawing media which can be applied to a substrate comprising (i) preparing a drawing media by mixing together a pigment, a binder, and a volatile low viscosity methylsilicone fluid having a formula selected from the group consisting of $[(CH_3)_2SiO]_x$ and $(CH_3)_3SiO[(CH_3)_2SiO]_ySi(CH_3)_3$ in which x is an integer having a value of from three to ten, and y is an integer having a value of from zero to about four: (ii) applying the methylsilicone fluid containing drawing media to a substrate; and (iii) allowing the drawing media to dry on the substrate.

2. A method according to claim 1 in which the volatile low viscosity methylsilicone fluid is a compound selected from the group consisting of hexamethyldisiloxane the formula $Me_3SiOSiMe_3$; octamethyltrisiloxane of the formula $Me_3SiOSiMe_3$; hexamethylcyclotrisiloxane of the formula $[(Me_2)SiO]_3$; octamethylcyclotetrasiloxane of the formula $[(Me_2)SiO]_4$; and decamethylcyclopentasiloxane of the formula $[(Me_2)SiO]_5$.

3. A method according to claim 1 in which the binder is a material selected from the group consisting of tragacanth gum and its derivatives; cellulose derivatives; alignates; gum arabic; stearyl alcohol, cetyl alcohol; polyvinyl alcohol; hydrocarbon waxes; animal fats; and vegetable fats.

4. A self-fixing drawing media for application to a substrate comprising a pigment; a binder; and a volatile low viscosity methylsilicone fluid; the fluid having a formula selected from the group consisting of $[(CH_3)_2SiO]_x$ and $(CH_3)_3SiO[(CH_3)_2SiO]_ySi(CH_3)_3$ in which x is an integer having a value of from three to ten, and y is an integer having a value of from zero to about four.

5. A media according to claim 4 in which the volatile low viscosity methylsilicone fluid is a compound selected from the group consisting of hexamethyldisiloxane of the formula $Me_3SiOSiMe_3$; octamethyltrisiloxane of the formula $Me_3SiOMe_2SiOSiMe_3$; hexamethylcyclotrisiloxane of the formula $[(Me_2)SiO]_3$; octamethylcyclotetrasiloxane of the formula $[(Me_2)SiO]_4$; and decamethylcyclopentasiloxane of the formula $[(Me_2)SiO]_5$.

6. A media according to claim 4 in which the binder a material selected from the group consisting of tragacanth gum and its derivative; cellulose derivatives; alignates; gum arabic; stearyl alcohol, cetyl alcohol; polyvinyl alcohol; hydrocarbon waxes; animal fats; and vegetable fats.

7. A media according to claim 4 in which the drawing media includes from 0.1 to 5.0 percent by weight of the pigment; from 30.0 to 90.0 percent by weight of the binder; and from 0.1 to 20.0 percent by weight of the methylsilicone fluid.

8. A method of making a drawing media which can be applied to a substrate comprising (i) preparing a drawing media by mixing together from 0.1 to 5.0 percent by weight of a pigment, from 30.0 to 90.0 percent by weight of a binder, and from 0.1 to 20.0 percent by weight of a volatile low viscosity methylsilicone fluid having a formula selected from the group consisting of $[(CH_3)_2SiO]_x$ and $(CH_3)_3SiO[(CH_3)_2SiO]_ySi(CH_3)_3$ in which x is an integer having a value of from three to ten, and y is an integer having a value of from zero to about four; (ii) forming the drawing media into the shape of a stick product (iii) applying the methylsilicone fluid containing stick drawing media to a substrate; and (iii) allowing the drawing media to dry on the substrate.

9. A method according to claim 8 in which the volatile low viscosity methylsilicone fluid is a compound selected from the group consisting of hexamethyldisiloxane of the formula $Me_3SiOSiMe_3$; octamethyltrisiloxane of the formula $Me_3SiOMe_2SiOSiMe_3$; hexamethylcyclotrisiloxane of the formula $[(Me_2)SiO]_3$; octamethylcyclotetrasiloxane of the formula $[(Me_2)SiO]_4$; and decamethylcyclopentasiloxane of the formula $[(Me_2)SiO]_5$.

10. A method according to claim 8 in which the binder is a material selected from the group consisting of tragacanth gum and its derivatives; cellulose derivatives; alignates; gum arabic; stearyl alcohol, cetyl alcohol; polyvinyl alcohol; hydrocarbon waxes; animal fats; and vegetable fats.

* * * * *